May 4, 1943.    S. SNYDER    2,318,125
LOCOMOTIVE SEAT STRUCTURE
Filed April 30, 1940
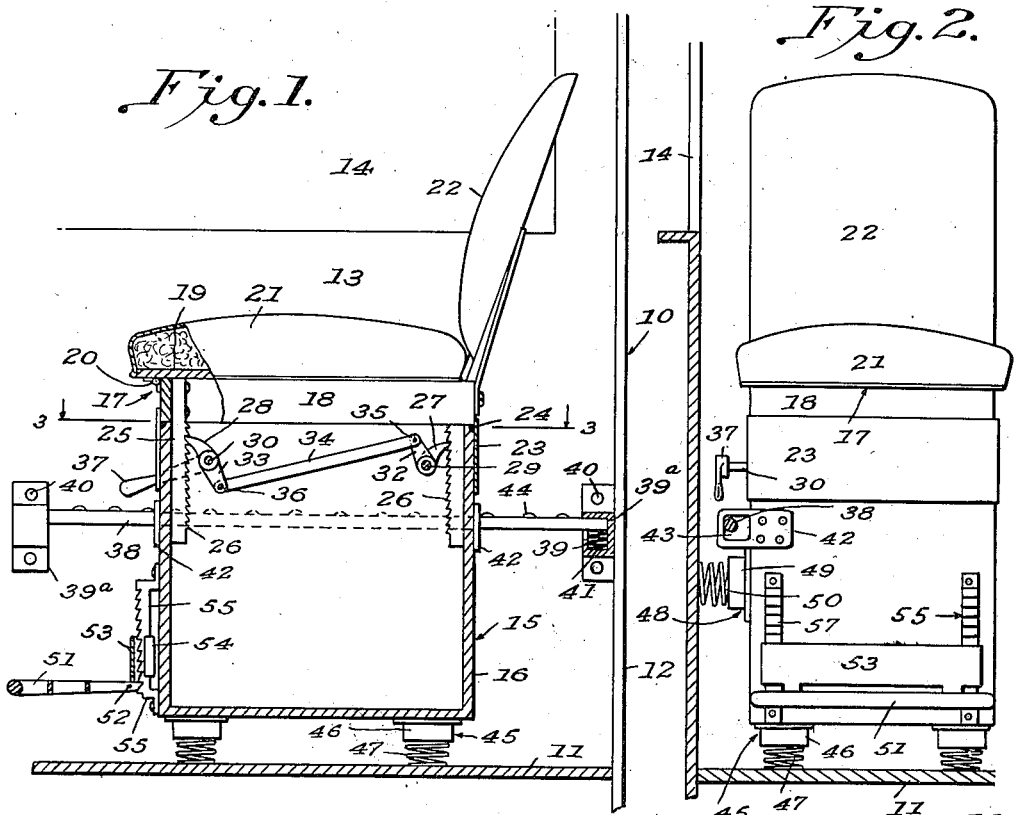
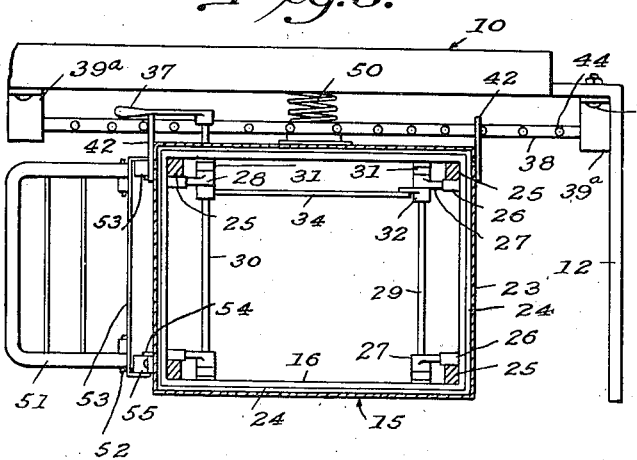
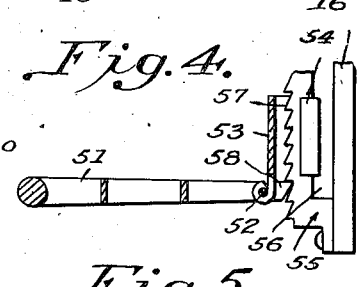
Inventor,
STANLEY SNYDER,
By
Attorney.

Patented May 4, 1943

2,318,125

UNITED STATES PATENT OFFICE 2,318,125

LOCOMOTIVE SEAT STRUCTURE

Stanley Snyder, Wilkes-Barre, Pa.

Application April 30, 1940, Serial No. 332,573

6 Claims. (Cl. 155—14)

This invention relates to a seat structure primarily for locomotive cabs, although adapted for other use and, for instance, by the driver of a bus.

Important aims are to provide a structure wherein the seat will be connected to a wall of the cab, so that the engineer will not be accidentally thrown from his proper position with respect to the locomotive controls and the cab window through rolling and pitching motion of the locomotive, in order to greatly minimize the danger of accidents.

Additional objects are to provide a seat of box-like form which is elevated with respect to the floor of the cab in order to be cooled, one which is cushioned from below and from one side and will well accommodate any movement of the body of the engineer, one in which the seat is adjustable by novel means longitudinally of the cab, in height and at a footrest carried thereby.

Further, I aim to provide a structure which is light in weight and less expensive to manufacture than existing seat structures.

Various additional objects and advantages will become apparent from a consideration of the description following taken in connection with accompanying drawing, illustrating an operative embodiment.

In said drawing:

Figure 1 is a view taken longitudinally through a fragment of a cab and my improved seat structure, parts being shown partly in elevation and partly in section;

Figure 2 is a view taken transversely through a fragment of a cab and showing my improved seat structure in front elevation;

Figure 3 is a cross sectional view taken approximately on the plane of line 3—3 of Figure 1;

Figure 4 is an enlarged detail taken longitudinally and in section through the footrest and mounting means therefor; and, Figure 5 is a plan view of the parts of Figure.

Referring specifically to the drawing, wherein like reference characters designate like or similar parts throughout the different views thereof, a locomotive cab is fragmentarily shown at 10, having a floor 11, rear wall 12, and side wall 13 provided with a window at 14, such parts being conventional.

My improved seat structure, as a whole, is designated 15 and is located within the cab 10 in the most advantageous position with respect to the window 14 and controls of the locomotive (not shown), such seat structure being adapted to be occupied by the engineer.

Said seat structure 15 generally is box-like, having a lower box section 16 and an upper seat section 17. Seat section 17 has a frame 18 which normally rests on the upper edge of the lower box section 16 and a seat proper or board 19 is hinged at 20 on a horizontal axis to the top of frame 18 at the front, so that the seat may be swung upwardly and forwardly to enable access to the interior of section 16, which is adapted to be used as a depository for personal effects of the engineer, such as, tobacco, tools, clothing and the like. Such seat 19 is adapted to be cushioned or upholstered in any suitable manner, as at 21; and at the rear of the frame 18, a suitable back 22, preferably upholstered or cushioned, rises to coact with the seat 19.

A continuous skirt 23 of canvas, other fabric, metal, or the like is fastened to and depends from the frame 18 and overlaps the exterior of the box-like section, thus effectively concealing the joint between the sections 16 and 17 and excluding the entrance of dust. A continuous gasket of rubber 24 is mounted at the upper outer corner of section 16 to coact with the skirt 23 and being in wiping engagement therewith, to further prevent the entrance of dust.

The seat section 17 is adjustable as to height, to which end positioning bars 25 depend from each inner corner from frame 18 into section 16, slidably engaging each inner corner on the latter section, so that the seat section 17 may be raised and lowered and maintained aligned with section 16, the skirt 23 and bars 25 sliding over the latter. Said bars 25 have ratchet or rack teeth 26, which are engaged by pawls 27 and 28, to maintain the seat section 17 at any desired elevation or adjusted position. Pawls 27 and 28 are rigid on parallel cross rods 29 and 30, respectively, journaled in suitable bearings 31. Said bearings 31 are located one adjacent each of the corners of box section 16, and fastened to adjacent inner wall surfaces of the latter. Cranks 32 and 33 extend rigidly from the rods 29 and 30, respectively, and are connected by a rod or link 34 pivoted thereto at 35 and 36, respectively. An operating lever or handle 37 is rigidly attached to one end of the rod 30 for operation to rock the rods 29 and 30 to displace the pawls 27 and 28 to enable adjustment of the seat section and then to replace the pawls to hold the seat section in adjusted position. It will be noted that the handle 37 is relatively heavy with the preponderance of weight forwardly of the pawls so that the latter will be urged by gravity into engagement with the teeth 26, and is located out of the way, preferably between one side of the box section 16 and the wall of the cab 13. Attention is called to the fact that the handle 37 may be used at either end of the rod 30.

The seat structure, as a whole, is attached or connected to the cab proper and particularly to a depressible anchor bar 38, which is horizontally disposed in spaced relation to said side wall 13, with opposite ends disposed in sockets 39 of brackets 39ª bolted at 40 to said side wall 13. Bar 38 is maintained in uppermost position by relatively strong coil springs 41.

Plates 42 are secured to the front and rear of the box-like section 16 and have portions projecting laterally therefrom provided with openings or eyes 43 through which the bar 38 extends. Said bar 38 on its upper surface has spaced apart projections 44 between which the plates 42 engage the bar 38, holding the seat against accidental longitudinal sliding or displacement, it being realized that the openings 43 are sufficiently large to engage and disengage the bar 38 between any of the projections 44, when desired.

Any desired number of spring devices are carried by the bottom wall of the box-like section 16, as at 45, and they may consist of receptacles 46 fastened to the section 16 and suspending cushioning coil springs 47, which are slidably engaged on the floor 11. One or more spring devices 48 similar to those at 45 are employed between the box-like section 16 and side wall 13 of the cab, the same having a receptacle 49 fastened to the box-like section 16 and having a coil cushioning spring 50 fastened thereto and slidably engaging the wall 13. Since the springs 47 and 50 are not attached to the floor 11 and wall 13, the seat may be readily raised and moved longitudinally in engaging and disengaging the plates 42 between projections 44 or the bar 38, or be simply pushed so that said plates 42 will cam projections 44 to depress the bar 38.

I have found that safety of operation of a locomotive is greatly increased when the footrest for the engineer is at the proper height for the most effective use by him. To this end, a footrest of suitable design is provided at 51, which is pivoted on a horizontal axis by means of pins 52 to a bracket 53 having vertically disposed hook-shaped end portions 54. Rack members 55 are fastened to the front of the box-like section 16 having vertical slots or openings 56 in which the hook-like portions 54 are engaged for vertical sliding movement. Rack members 55 have teeth at 57, which are engaged by the inner end or pawls 58 of the footrest 51. It will be noted that the footrest 51, as a result, is adjustable to any suitable height desired by the engineer, it simply being necessary to move the footrest 51 upwardly at its outer end, swinging it on the axis of pins 52 so as to slip past teeth at 57 and into engagement with those at the proper height whereupon the rest 51 is again moved to horizontal position, in which position it will remain, since the axis 52 is off center and the preponderance of weight is forwardly thereof.

Various changes may be resorted to, provided they fall within the spirit and scope of my invention.

I claim as my invention:

1. In combination with a vehicle, a bar disposed longitudinally therein above the floor spaced throughout the major portion of its length from a wall of the vehicle and fastened to the vehicle, a seat structure slidably mounted for movement along said bar, and means on said seat structure slidably engaging said bar consisting of plates on the seat structure having openings through which the bar passes enlarged with respect to the bar, said bar having a series of spaced projections between which said plates are engageable and means mounting said bar for depression.

2. In combination with a vehicle, an approximately horizontal bar member mounted therein, a seat within said vehicle, and an anchoring means on said seat engageable with said bar member; said seat and said means being slidable along said bar member whereby said bar member and said means function dually as a guide means and as a locking means for said seat in a plurality of adjusted positions, means at each end of said bar member mounting the same in said vehicle for bodily displacement of the same away from the center line thereof, said bar member having spaced portions for engagement with said anchoring means, and said portions being provided with cam surfaces effective to displace the bar as aforesaid upon movement of the seat in fore and aft directions.

3. In combination with a vehicle, an approximately horizontal bar member mounted therein, a seat within said vehicle, and an anchoring means on said seat engageable with said bar member; said seat and said means being slidable along said bar member whereby said bar member and said means function dually as a guide means and as a locking means for said seat in a plurality of adjusted postions, means at each end of said bar member mounting the same in said vehicle for bodily displacement of the same away from the center line thereof, resilient means maintaining each end of the bar member in and urging the same to normal position, said bar member having spaced portions for engagement with said anchoring means, and said portions being provided with cam surfaces effective to displace the bar member as aforesaid upon movement of the seat in fore and aft directions.

4. In combination with a vehicle, an approximately horizontal bar mamber mounted therein, a seat within said vehicle, and an anchoring means on said seat engageable with said bar member; said seat and said means being slidable along said bar member whereby said bar member and said means function dually as a guide means and as a locking means for said seat in a plurality of adjusted positions, said first mentioned means being a plate having an opening through which the bar member passes and which opening is enlarged with respect to the bar member, means at each end of said bar member mounting the same in said vehicle for bodily displacement of the same away from the center line thereof, said bar member having spaced portions for engagement with said plate, and said portions being provided with cam surfaces effective to displace the bar member as aforesaid in said opening upon movement of the seat in fore and aft directions.

5. In combination with a vehicle, an approximately horizontal bar member mounted therein, a seat within said vehicle, and an anchoring means on said seat engageable with said bar member; said seat and said means being slidable along said bar member whereby said bar member and said means function dually as a guide means and as a locking means for said seat in a plurality of adjusted positions, said first mentioned means comprising a plurality of elements spaced apart longitudinally with respect to the bar member each having an opening through which the bar member passes and which openings are enlarged with respect to the bar member, means at each end of the bar member mounting the same in said vehicle for bodily displacement of the same in said openings away from the center line of said bar member, said bar member having spaced portions for engagement with said elements, and said portions being provided with cam surfaces effective to displace the bar member as aforesaid in said openings upon movement of the seat in fore and aft directions.

6. In combination with a vehicle, an approximately horizontal bar member mounted therein, a seat within said vehicle, an anchoring means on said seat engageable with said bar member; said seat and said means being slidable along said bar member whereby said bar member and said means function dually as a guide means and as a locking means for said seat in a plurality of adjusted positions, said first mentioned means comprising a plurality of plates spaced apart longitudinally with respect to the bar member each having an opening through which the bar member passes and which openings are enlarged with respect to the bar member, a bracket at each end of the bar member mounting the same in said vehicle for bodily displacement of the same in said openings away from the center line of said bar member, resilient means mounted by the brackets maintaining each end of the bar member in and urging the same to normal position, said bar member having spaced portions for engagement with said plates, and said portions being provided with cam surfaces effective to displace the bar member as aforesaid in said openings upon movement of the seat in fore and aft directions.

STANLEY SNYDER.